May 9, 1950     H. F. VINCENT     2,507,069
DETACHABLE AUXILIARY FUEL TANK FOR AIRCRAFT
Filed Nov. 20, 1945     3 Sheets-Sheet 1
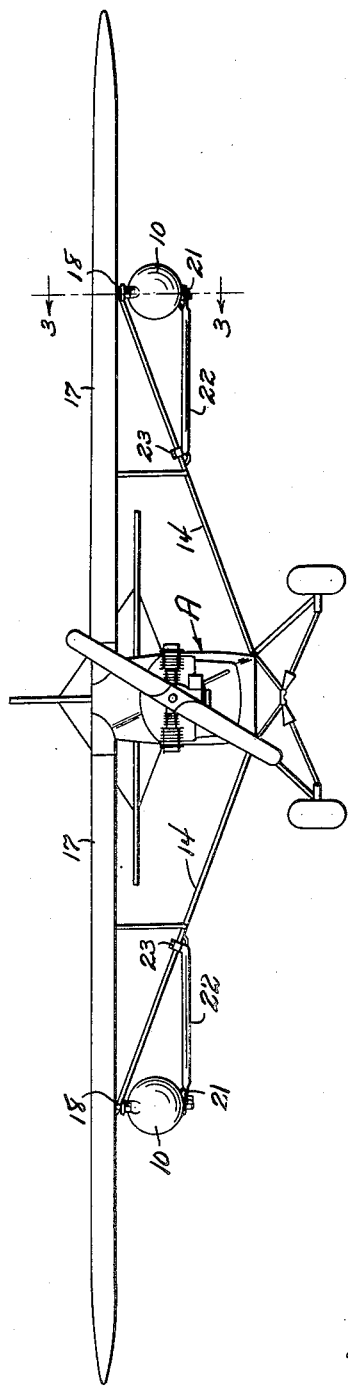
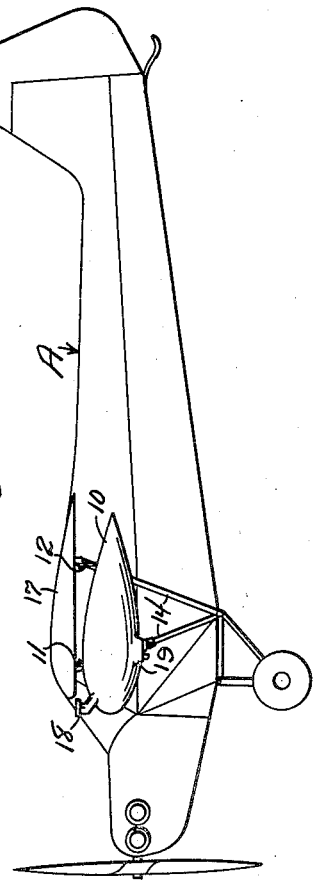
INVENTOR.
H. Farley Vincent
BY Victor J. Evans & Co.
ATTORNEYS May 9, 1950 H. F. VINCENT 2,507,069
DETACHABLE AUXILIARY FUEL TANK FOR AIRCRAFT
Filed Nov. 20, 1945 3 Sheets-Sheet 2

INVENTOR.
H. Farley Vincent
BY Victor J. Evans & Co.
ATTORNEYS

May 9, 1950        H. F. VINCENT        2,507,069
DETACHABLE AUXILIARY FUEL TANK FOR AIRCRAFT
Filed Nov. 20, 1945        3 Sheets-Sheet 3
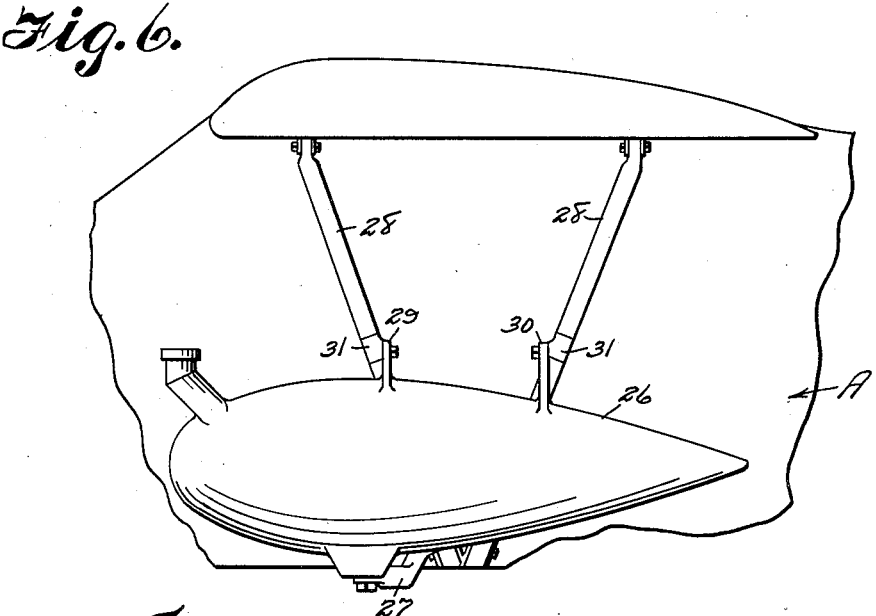
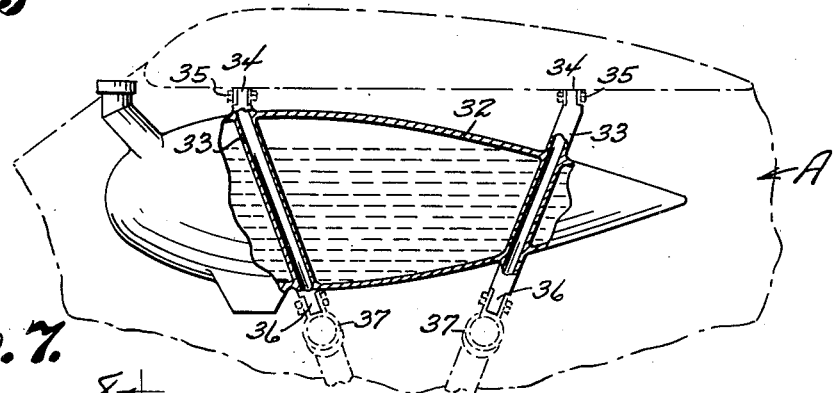
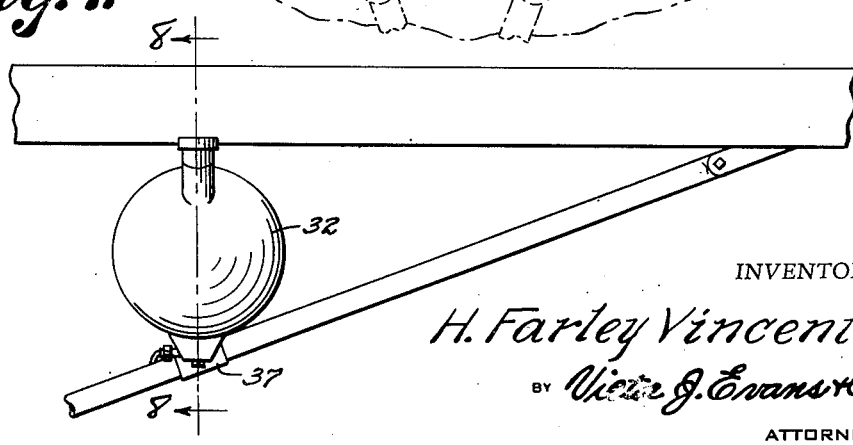
INVENTOR.
H. Farley Vincent
BY Victor J. Evans & Co.
ATTORNEYS Patented May 9, 1950

2,507,069

UNITED STATES PATENT OFFICE 2,507,069

DETACHABLE AUXILIARY FUEL TANK FOR AIRCRAFT

H. Farley Vincent, New Orleans, La.

Application November 20, 1945, Serial No. 629,725

1 Claim. (Cl. 244—135)

The invention relates to a fuel tank and attachments therefor, and more especially to an auxiliary fuel tank for strut-braced high wing type aircrafts.

The primary object of the invention is the provision of a tank of this character, wherein it involves novel and simple means for securing it in place within the aircraft of that type stated. The tank is so constructed as to enable it to be attached through the medium of bolts already in use in connection with the struts of the aircraft, and through the agency of a streamline strut equipped with a clamp adapted to embrace a wing strut.

Another object of the invention is the provision of a tank of this character, wherein the construction thereof enables interconnection thereof with the aircraft struts built into the latter, thus avoiding any alteration in the original construction of such aircraft.

A further object of the invention is the provision of a tank of this character, wherein there is no interference with the flight of the aircraft, or does the said tank overbalance the latter during flight, and on the grounding of such craft the said tank can be readily and conveniently filled with fuel for supplying the motor thereof.

A still further object of the invention is the provision of a tank of this character, which is simple in construction, thoroughly reliable and efficient in its purpose, it being strut hung, readily and easily accessible, strong, durable, and inexpensive to manufacture and install.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 1 is an elevation of an aircraft showing the auxiliary tank assembly constructed in accordance with the invention.

Figure 2 is a side view thereof.

Figure 6 is a side view thereof.

Figure 7 is a fragmentary front elevation showing a slight variation.

Figure 8 is a partial sectional view taken on the line 8—8 of Figure 7 looking in the direction of the arrows.

Similar reference characters indicate corresponding parts throughout the several views in the drawings.

Figure 3:
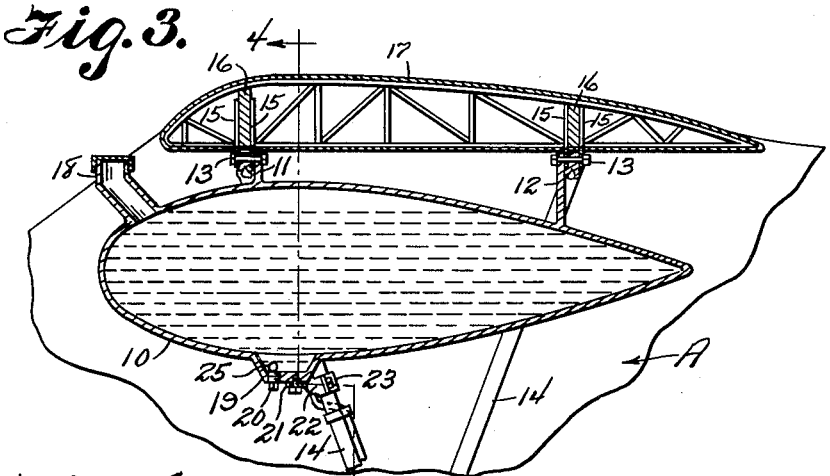
Figure 3 is a sectional view taken on the line 3—3 of Figure 1 looking in the direction of the arrows.
Figure 4:
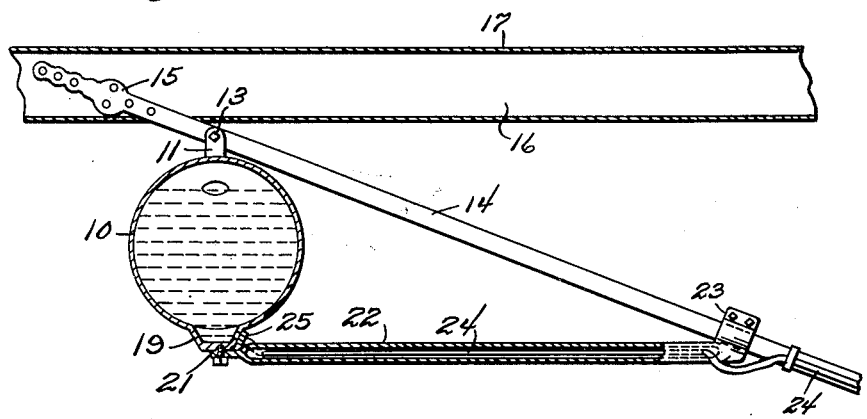
Figure 4 is a sectional view taken on the line 4—4 of Figure 3 looking in the direction of the arrows.

Referring to the drawings in detail, particularly Figures 1 to 4 inclusive, the auxiliary tank and mounting constituting the present invention comprises a substantially cigar-shaped, or streamlined body 10, which centrally at the exterior longitudinal top area thereof has integral therewith a short fore and a longer aft perpendicularly disposed suspension brackets 11 and 12, respectively, these being detachably secured by the bolts 13, connecting the struts 14 to the fittings 15, attaching the said struts to the spars 16 of the assembly of a wing 17, as best seen in Figures 3 and 4 of the drawings. In this manner the body 10 sets at an underslung level with relation to the wing 17.

The tank body 10 is equipped with a filling spout 18 and a sump 19, provided with a drain plug 20, the spout 18 being forwardly of the said body. To the sump 19 is attached the terminal ear 21 of a laterally arranged tubular brace 22 which at the other end is provided with a sectional clamp creating a coupling 23, designed to firmly embrace one of the wing struts 14, both of the latter being set in an upward divergent relation to one another for approaching the wing 17.

Threaded through the brace 22 is a feed line 24 for delivering fuel from the tank body 10, to the motor of the aircraft, the line 24 being union fitted at 25 to the sump of the said body, as shown in Figure 3 of the drawings.

Figure 5:
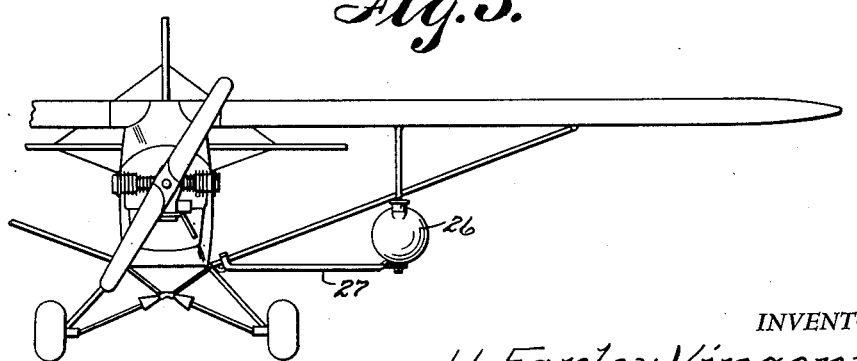
Figure 5 is a fragmentary enlarged view similar to Figure 1 showing the high wing strut-braced type of aircraft association.

In Figures 5 and 6 of the drawings, the tank body 26, which is identical to the body 10 has the brace 27 clamped to one of the wing struts 28, while the brackets 29 and 30, respectively, alike to the brackets 11 and 12, are fitted by clamps 31, similar to the clamp 23 attached to both of the wing struts 28 at a distance removed from the wing of the craft as best seen in those figures just mentioned.

In Figures 7 and 8 of the drawings, the tank body 32 formed therewith strut sections 33, both being extended exteriorly of such body 32 above and below the same, the upper extensions 34 taking the place of the brackets before referred to, and are bolted at 35 to the fittings of the wing struts and spars previously mentioned, while the lowermost extensions 36 having clamp coupling 37 to such struts, as best seen in said Figures 7 and 8.

It is understood that several tank bodies are employed, and one is arranged at one side of the fuselage, denoted generally at A, and the other at the other side thereof in the aircraft assembly, either of the low or high wing types.

As has been stated, the essence of the invention is the novel and simple means for securing the fuel tank to an aircraft of the types stated, the tank being so constructed as to enable it to be attached through the medium of bolts already in use in connection with the struts of the aircraft, and through the medium of a streamlined strut or brace equipped with a clamp adapted to embrace a wing strut.

What is claimed is:

In a fuel system for an aircraft having a wing and wing struts extending angularly from the same, the combination of a substantially teardrop shaped fuel container having its longitudinal axis substantially parallel to a wing, a fore suspension bracket extending upwardly from said container, an aft suspension bracket extending upwardly from said container, means securing said brackets to respective wing struts of a wing whereby said container is slung under a wing, said brackets being of different lengths whereby said container longitudinal axis is parallel to a wing, said brackets being spaced apart in the direction of said longitudinal axis of said container, and extending perpendicular to said longitudinal axis, a tubular brace extending perpendicularly to the vertical plane of, and below, said longitudinal axis of the container, means securing the ends of said brace to the bottom of said container and to one of the wing struts, respectively, of a wing whereby said container is braced against swinging movement, and a feed line communicating with said container and extending lengthwise through substantially the complete length of said brace.

H. FARLEY VINCENT.

REFERENCES CITED

The following references are of record in the file of this patent:

UNITED STATES PATENTS

| Number | Name | Date |
| --- | --- | --- |
| 1,323,843 | Curtiss | Dec. 2, 1919 |
| 1,336,634 | Kleckler | Apr. 13, 1920 |
| 1,379,525 | Caudron | May 24, 1921 |
| 2,038,998 | Hammond | Apr. 28, 1936 |
| 2,124,867 | Akerman | July 26, 1938 |
| 2,277,242 | Makaroff | Mar. 24, 1942 |
| 2,398,704 | Gassner | Apr. 16, 1946 |